UNITED STATES PATENT OFFICE.

THOMAS S. HUNT, OF BOSTON, MASSACHUSETTS.

IMPROVEMENT IN PRECIPITATING COPPER BY MEANS OF TIN-SCRAP.

Specification forming part of Letters Patent No. 150,957, dated May 19, 1874; application filed December 8, 1873.

*To all whom it may concern:*

Be it known that I, THOMAS STERRY HUNT, of Boston, Massachusetts, have invented a new use and application for scrap tinned sheet-iron, commonly known as tin-plate scrap, of which the following is a specification:

This invention consists in using tin-plate scrap or waste for the precipitation of copper from the solutions obtained in the various wet processes of copper extraction, and in saving in the operation the adhering tin. The copper solution must contain at the same time protochloride of copper (otherwise called cupric chloride) and sulphate of soda, or some other base. Such solutions are obtained from sulphureted copper ores which have been calcined with common salt, as in the Longmaid or Henderson process, or when similar ores after roasting are digested with chlorides of iron or other chlorides, as, for example, in the Hunt and Douglas patent process. In case, however, the solutions of copper to be precipitated contain no chlorides, I add a portion of common salt, and in case they contain no sulphates I add a portion of sulphate of soda or other soluble sulphate. In either case these salts may equal the amount of copper present. Such solutions, containing both chlorides and sulphates, especially if heated, as is usual in copper precipitation, very quickly dissolve the tin from tinned iron when this is immersed therein, and at once let it fall again as an insoluble hydrated oxide of tin, which may be readily drawn off while suspended in the liquid, and collected by subsidence in proper tanks, to be subsequently treated by methods known to chemists, such as dissolving in hydrochloric acid and precipitating by metallic zinc, by reduction in the dry way, or by conversion into stannate of soda. The scrap-iron thus freed from tin is then employed in the ordinary way to precipitate the dissolved copper, as metallic or cement copper, from the solutions described. The copper solution holding the suspended oxide of tin may be drawn off at once from the iron to the settling-tank, and a fresh solution added; or the precipitation of the copper may be carried on without interruption in the first solution till this is exhausted, and the oxide of tin afterward separated from the metallic copper by taking advantage of the greater lightness and the more finely-divided state of the former. Should it be desirable to remove the tin from the iron plate without causing an immediate precipitation of copper thereon, this may be effected by mixing a solution of perchloride or other persalt of iron with the copper solution.

I do not claim the use of iron for precipitating copper from its solutions, nor the modes of treating the separated oxide of tin, nor any particular arrangement or apparatus for the operation above described.

What I claim is—

1. The use and application of tin-plate scrap or waste for precipitating metallic copper from its solutions, substantially as above described.

2. The recovery and utilization of the tin from the tin-plate scrap by means of its solution and subsequent precipitation as oxide of tin in solutions containing protochloride of copper and a sulphate, substantially as above described.

Boston, December 8, 1873.

THOMAS STERRY HUNT.

Witnesses:
 J. M. RYDER,
 JNO. H. BLAKE.